(12) United States Patent
Todaka et al.

(10) Patent No.: US 10,180,762 B2
(45) Date of Patent: Jan. 15, 2019

(54) SURFACE PROTECTION FILM, CAPACITIVE TOUCH PANEL, AND IMAGE DISPLAY DEVICE

(71) Applicant: LINTEC Corporation, Tokyo (JP)

(72) Inventors: Masaya Todaka, Tokyo (JP); Baku Katagiri, Tokyo (JP); Kenta Tomioka, Tokyo (JP); Tomoo Orui, Tokyo (JP)

(73) Assignee: LINTEC Corporation, Tokyo (JP)

( * ) Notice: Subject to any disclaimer, the term of this patent is extended or adjusted under 35 U.S.C. 154(b) by 0 days.

(21) Appl. No.: 15/541,131

(22) PCT Filed: Jul. 17, 2015

(86) PCT No.: PCT/JP2015/070591
§ 371 (c)(1),
(2) Date: Jun. 30, 2017

(87) PCT Pub. No.: WO2017/013717
PCT Pub. Date: Jan. 26, 2017

(65) Prior Publication Data
US 2017/0349790 A1    Dec. 7, 2017

(51) Int. Cl.
*C09J 7/22*    (2018.01)
*G06F 3/044*    (2006.01)
(Continued)

(52) U.S. Cl.
CPC .............. *G06F 3/044* (2013.01); *C09J 7/22* (2018.01); *C09J 7/38* (2018.01); *C09J 201/00* (2013.01); *C09J 2201/606* (2013.01); *C09J 2201/622* (2013.01); *C09J 2203/318* (2013.01); *C09J 2451/00* (2013.01); *G06F 2203/04103* (2013.01)

(58) Field of Classification Search
USPC ..................................................... 345/174
See application file for complete search history.

(56) References Cited

U.S. PATENT DOCUMENTS

2002/0154348 A1* 10/2002 Takada ..................... G02B 5/32
359/15
2004/0189907 A1* 9/2004 Tominaga ......... G02F 1/133528
349/115

(Continued)

FOREIGN PATENT DOCUMENTS

JP    2003015531 A    1/2003
JP    2005326661 A    11/2005
JP    2011129110 A    6/2011

OTHER PUBLICATIONS

International Search Report of PCT/JP2015/070591 dated Oct. 8, 2015 (English Translation).

*Primary Examiner* — Srilakshmi K Kumar
*Assistant Examiner* — Chineyere Wills-Burns
(74) *Attorney, Agent, or Firm* — Renner, Kenner; Arthur M. Reginelli

(57) ABSTRACT

Provided are a surface protection film which would stably display an image, and would stably attain a mirror state, and which would be stably operated without inhibiting display operability.
Disclosed is a surface protection film including a resin film and a pressure-sensitive adhesive layer, in which the relative permittivity of the resin film is of 1.0 to 5.0, the reflectance is set to a value within the range of 20% to 80%, and the transmittance for light is of 20% to 80%.

4 Claims, 7 Drawing Sheets

(51) Int. Cl.
*C09J 201/00* (2006.01)
*C09J 7/38* (2018.01)

(56) References Cited

U.S. PATENT DOCUMENTS

2008/0094714 A1* 4/2008 Shibasaki ............... B60R 1/083
 359/603
2013/0158221 A1* 6/2013 Banba .................... C09J 133/06
 526/263

* cited by examiner

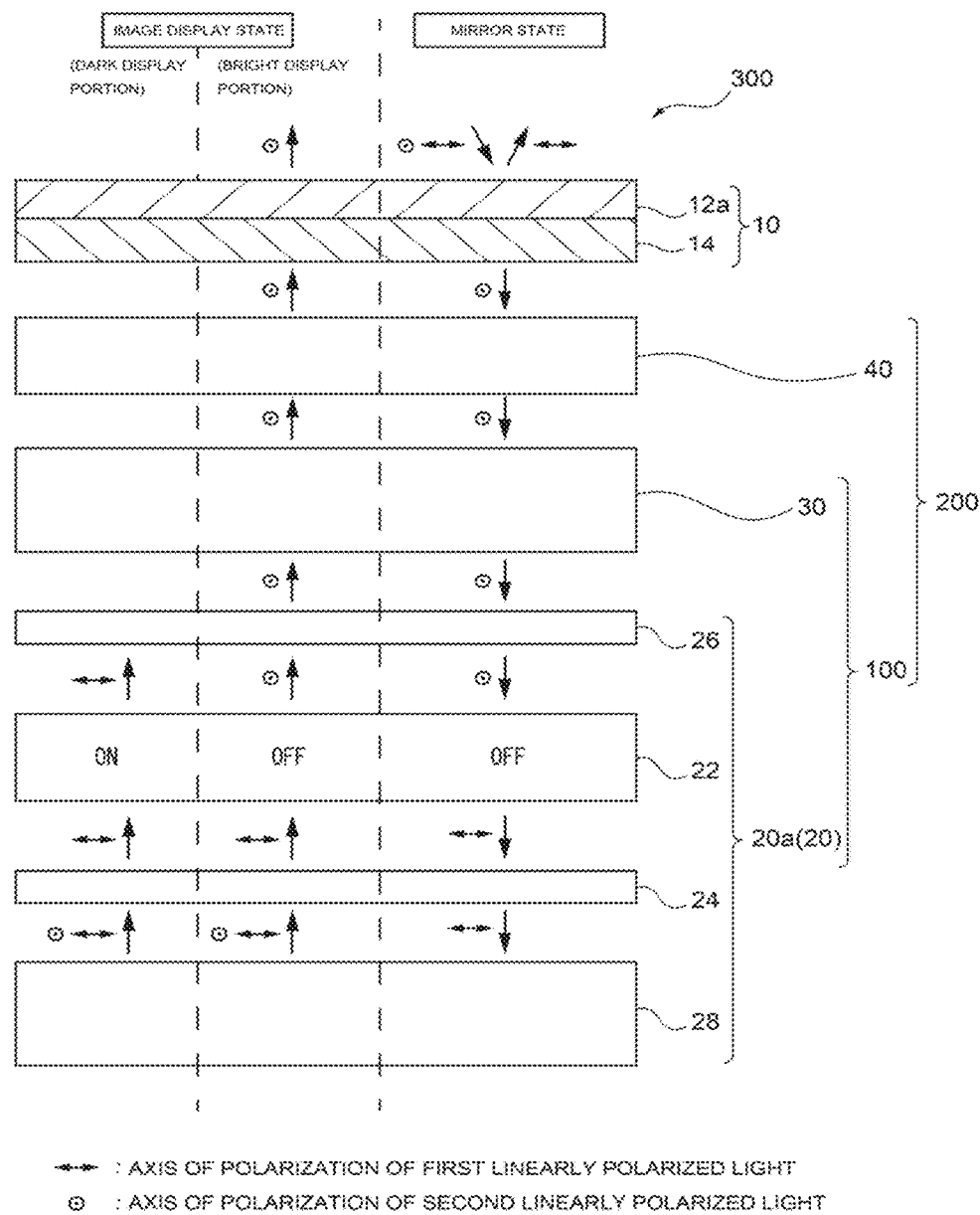

SURFACE PROTECTION FILM, CAPACITIVE TOUCH PANEL, AND IMAGE DISPLAY DEVICE

TECHNICAL FIELD

The present invention relates to a surface protection film, a capacitive touch panel, and an image display device.

More particularly, the present invention relates to a surface protection film that would stably display an image by effectively transmitting display light coming from a display panel, and would stably adopt a mirror state by efficiently reflecting external light in a situation where there is no display light coming from the display panel, the surface protection film being stably operable without inhibiting display operability even in a case in which the surface protection film is attached to the viewer's side of a capacitive touch panel; a capacitive touch panel using the surface protection film; and an image display device.

BACKGROUND ART

Regarding image display devices in personal computers, mobile telephones and the like, image display devices that would display the display light coming from a display panel as images and would be utilized as mirrors in a situation where there is no display light, by providing a half-mirror film in the inside or outside of the vicinity on the viewer's side of the image display device, have been hitherto developed (for example, Patent Documents 1 to 3).

Meanwhile, in recent years, opportunities for using capacitive touch panels have dramatically increased as a result of wide distribution of mobile electronic devices such as so-called smart phones and tablet terminals.

Such a capacitive touch panel is generally configured to have a position input device comprising an insulator film, a patternized transparent conductive layer and the like provided on a display panel such as a liquid crystal display panel or an organic electroluminescent display panel. Furthermore, there also exist capacitive touch panels having a so-called in-cell type configuration, in which a position input means is incorporated into a display panel.

Furthermore, a capacitive touch panel is incorporated into a housing together with other control instruments on the occasion of constructing an image display device, and a protection plate made of glass or a resin is provided on the viewer's side. At this time, there may be a gap between the protection plate and the capacitive touch panel, or the gap may be filled with an adhesive or a pressure-sensitive adhesive.

Furthermore, in a capacitive touch panel, a very low voltage is applied to a transparent conductive film, charge is accumulated on the surface of the transparent conductive film, and thereby an electric field is formed on the surface. Regarding the surface, when a conductor such as a finger or a touch pen touches on the capacitive touch panel, discharge occurs, and the electric field undergoes a slight change.

Therefore, in a capacitive touch panel, the position of contact by a finger or the like would be specified by detecting such slight change in the electric field.

CITATION LIST

Patent Documents

Patent Document 1: JP 7-8835 U (Claims)
Patent Document 2: JP 2003-15531 A (Claims)
Patent Document 3: JP 2005-326661 A (Claims)

SUMMARY OF THE INVENTION

Problems to be Solved by the Invention

Regarding the conventional half-mirror films that mirrorize the surfaces of image display devices as described in Patent Document 1, Patent Document 2 and the like, resin films having a deposited metal layer have been generally used, as described in Patent Document 3.

However, in a case in which a resin film having a deposited metal layer is attached to a capacitive touch panel, there is a problem that display operability does not function properly.

That is, it becomes difficult to maintain sufficient charge at the surface of a transparent conductive film that constitutes the capacitive touch panel, due to the influence of the deposited metal layer. As a result, there is a problem that the detection sensitivity of the capacitive touch panel is markedly lowered, and consequently display operability does not function properly.

Thus, the inventors of the present invention have conducted thorough studies under such circumstances as described above, and as a result, the inventors have found that upon constructing a surface protection film for display, the problems described above could be solved by using a resin film having a predetermined relative permittivity and also having a predetermined reflectance and a predetermined transmittance as a film base material. Thus, the inventors have completed the present invention.

That is, an object of the present invention is to provide a surface protection film which would stably display an image by effectively transmitting display light coming from a display panel, and would stably retain a mirror state by efficiently reflecting external light in a situation where there is no display light coming from a display panel, the surface protection film being stably operable without inhibiting display operability even in a case in which the surface protection film is attached on the viewer's side of a capacitive touch panel; a capacitive touch panel using the surface protection film; and an image display device.

Means for Solving Problems

According to an aspect of the present invention, there is provided a surface protection film to be attached on the viewer's side of a capacitive touch panel, the surface protection film including a resin film and a pressure-sensitive adhesive layer, in which the relative permittivity of the resin film measured at a frequency of 1 MHz is set to a value within the range of 1.0 to 5.0, the reflectance for light having a wavelength of 555 nm is set to a value within the range of 20% to 80%, and the transmittance for light having a wavelength of 555 nm is set to a value within the range of 20% to 80%.

That is, when the surface protection film of the present invention is used, since the reflectance and transmittance of the resin film for light having a wavelength of 555 nm are defined to be in predetermined ranges, the surface protection film would stably display an image by efficiently transmitting display light coming from a display panel, and would stably retain a mirror state by efficiently reflecting external light in a situation where there is no display light coming from a display panel.

Furthermore, since the relative permittivity of the resin film is defined to be in a predetermined range, even in a case in which the surface protection film is attached to the viewer's side of a capacitive touch panel, the capacitive touch panel would be stably operated without inhibiting display operability.

Also, since the surface protection film has a pressure-sensitive adhesive layer, a mirror function could be easily imparted to an existing image display device, only by attaching the surface protection film to the image display device.

On the occasion of constructing the surface protection film of the present invention, it is preferable that the average reflectance of the resin film for light having a wavelength of 370 to 810 nm is adjusted to a value within the range of 20% to 80%, and the average transmittance for light having a wavelength of 370 to 810 nm is adjusted to a value within the range of 20% to 80%.

When such a configuration is adopted, a portion of the colors constituting a display image in the image display state and a reflected image in the mirror state becoming less visible would be effectively suppressed.

Furthermore, on the occasion of constructing the surface protection film of the present invention, it is preferable that the resin film includes a reflective polarizing film.

When such a configuration is adopted, particularly in a case in which the display panel of the image display device is a liquid crystal display panel, the surface protection film would stably display an image by efficiently transmitting display light in the image display state, and would give a clear reflected image by efficiently reflecting external light in the mirror state.

According to another aspect of the present invention, there is provided a capacitive touch panel, in which the above-described surface protection film is attached on the viewer's side.

That is, when the capacitive touch panel of the present invention is used, images would be displayed stably by having a predetermined surface protection film attached to the capacitive touch panel. On the other hand, in a situation where there is no display light coming from the display panel, a mirror state would be stably retained. Furthermore, display operability would be stably maintained.

According to still another aspect of the present invention, there is provided a surface protection film-attached image display device having a capacitive touch panel, the image display device having the above-described surface protection film attached on the viewer's side surface of the image display device.

That is, when the image display device of the present invention is used, the image display device would stably display images by having a predetermined surface protection film attached to the image display device. On the other hand, in a situation in which there is no display light coming from the display panel, a mirror state would be stably attained. Furthermore, display operability would be maintained stably.

BRIEF DESCRIPTION OF DRAWINGS

FIG. 3 is a diagram provided in order to describe an image display device according to the present invention;

MODES FOR CARRYING OUT THE INVENTION

[First Embodiment]

Figure 1A:
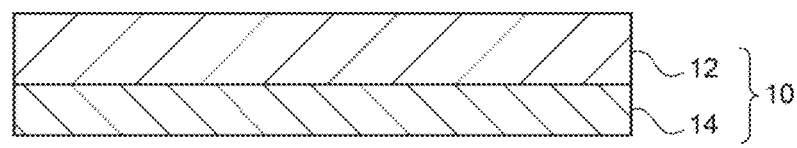
FIGS. 1(a) to 1(c) are diagrams provided in order to describe a surface protection film according to the present invention.

The first embodiment of the present invention is, as illustrated in FIG. 1(a), a surface protection film 10 to be attached on the viewer's side of a capacitive touch panel, the surface protection film 10 including a resin film 12 and a pressure-sensitive adhesive layer 14, in which the relative permittivity of the resin film 12 measured at a frequency of 1 MHz is set to a value within the range of 1.0 to 5.0, the reflectance for light having a wavelength of 555 nm is set to a value within the range of 20% to 80%, and the transmittance for light having a wavelength of 555 nm is set to a value within the range of 20% to 80%.

In the following description, a surface protection film according to the first embodiment of the present invention will be specifically described with reference to the drawings as appropriate.

1. Resin Film (1) Relative Permittivity

In regard to the resin film according to the present invention, the relative permittivity measured at a frequency of 1 MHz is set to a value within the range of 1.0 to 5.0.

The reason for this is that if the relative permittivity of the resin film has a value of below 1.0, there may be excessive limitations on the range of resins that would be used. On the other hand, it is because if the relative permittivity of the resin film has a value of above 5.0, in a case in which the surface protection film is attached on the viewer's side of a capacitive touch panel, display operability may be excessively inhibited.

Therefore, it is more preferable that the lower limit of the relative permittivity of the resin film measured at a frequency of 1 MHz is set to a value of 1.5 or more, and even more preferably, to a value of 2 or more.

Furthermore, it is more preferable that the upper limit of the relative permittivity of the resin film measured at a frequency of 1 MHz is set to a value of 4 or less, and even more preferably, to a value of 3 or less.

(2) Optical Characteristics (2)-1 Reflectance

In regard to the resin film according to the present invention, the reflectance for light having a wavelength of 555 nm is set to a value within the range of 20% to 80%.

The reason for this is that if such reflectance of the resin film has a value of below 20%, since the wavelength at which the human eye can sense brightness with the highest sensitivity is 555 nm, when a mirror state is attained in a situation where there is no display light coming from the display panel, it may be difficult to visually recognize a clear reflected image. On the other hand, it is because if such reflectance of the resin film has a value of above 80%, when an image is displayed by transmitting display light coming from a display panel, reflected light may excessively interfere with the display light, and thereby it may be difficult to stably display the image.

Therefore, it is more preferable that the lower limit of reflectance of the resin film for light having a wavelength of 555 nm is set to a value of 35% or more, and even more preferably, to a value of 45% or more.

Furthermore, it is more preferable that the upper limit of reflectance of the resin film for light having a wavelength of 555 nm is set to a value of 65% or less, and even more preferably, to a value of 55% or less.

Furthermore, in regard to the resin film according to the present invention, it is preferable that the average reflectance for light having a wavelength of 370 to 810 nm (visible light) is set to a value within the range of 20% to 80%.

The reason for this is that if such average reflectance of the resin film has a value of below 20%, when a mirror state is attained in a situation where there is no display light coming from the display panel, it may be difficult to visually recognize a portion of the colors that constitute a reflected image. On the other hand, it is because if such average reflectance of the resin film has a value of above 80%, when an image is displayed by transmitting display light coming from the display panel, reflected light may excessively interfere with the display light, and thereby it may be difficult to visually recognize the image.

Therefore, it is more preferable that the lower limit of the average reflectance of the resin film for light having a wavelength of 370 to 810 nm is set to a value of 35% or more, and even more preferably, to a value of 45% or more.

Furthermore, it is more preferable that the upper limit of the average reflectance of the resin film for light having a wavelength of 370 nm to a value of 65% or less, and even more preferably, to a value of 55% or less.

(2)-2 Transmittance

In regard to the resin film according to the present invention, the transmittance for light having a wavelength of 555 nm is set to a value within the range of 20% to 80%.

The reason for this is that if such transmittance of the resin film has a value of below 20%, when an image is displayed by transmitting display light coming from the display panel, it may be difficult to clearly display an image. On the other hand, it is because if such transmittance of the resin film has a value of above 80%, the reflected light intensity may be decreased, and the function as a mirror may not be accomplished.

Therefore, it is more preferable that the lower limit of transmittance of the resin film for light having a wavelength of 555 nm is set to a value of 35% or more, and even more preferably, to a value of 45% or more.

Furthermore, it is more preferable that the upper limit of the transmittance of the resin film for light having wavelength of 555 nm is set to a value of 65% or less, and even more preferably, to a value of 55% or less.

Furthermore, in regard to the resin film according to the present invention, it is preferable that the average transmittance for light having a wavelength of 370 to 810 nm is set to a value within the range of 20% to 80%.

The reason for this is that if such average transmittance of the resin film has a value of below 20%, when an image is displayed by transmitting display light coming from the display panel, it may be difficult to visually recognize a portion of the colors that constitute a display image. On the other hand, if such average transmittance of the resin film has a value of above 80%, the reflected light intensity may be decreased, and the function as a mirror may not be accomplished.

Therefore, it is more preferable that the lower limit of the average transmittance of the resin film for light having a wavelength of 370 to 810 nm is set to a value of 35% or more, and even more preferably, to a value of 45% or more.

Furthermore, it is more preferable that the upper limit of the average transmittance of the resin film for light having a wavelength of 370 to 810 nm is set to a value of 65% or less, and even more preferably, to a value of 55% or less.

Meanwhile, it is preferable that the total light transmittance is set to a value within the range of 10% to 90%, and it is even more preferable that the total light transmittance is set to a value within the range of 40% to 60%.

Furthermore, it is preferable that the haze value is set to a value within the range of 0.1% to 10%, and it is more preferable that the haze value is set to a value of 0.5% to 1.0%.

(2)-3 Polarization Characteristics

It is also preferable that the resin film includes a reflective polarizing film.

The reason for this is that when the resin film includes a reflective polarizing film, particularly in a case in which the display panel of an image display device is a liquid crystal display panel, an image would be stably displayed by efficiently transmitting the display light in the image display state, and a clear reflected image would be obtained by efficiently reflecting external light in the mirror state.

Figure 2:
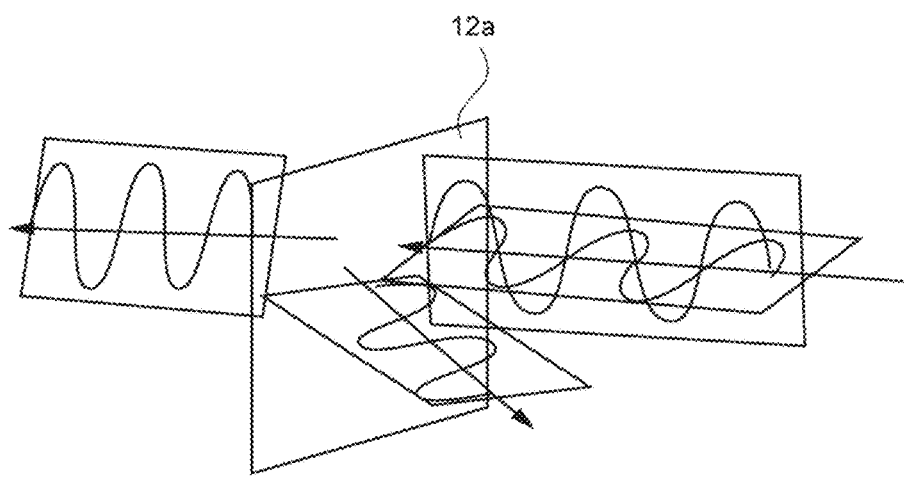
FIG. 2 is a diagram provided in order to describe a reflective polarizing film.

That is, as illustrated in FIG. 2, when a reflective polarizing film 12a is used, in the case of being irradiated with light, the reflective polarizing film 12a would transmit polarized light components that coincide with the axis of transmission of the reflective polarizing film 12a, and would reflect polarized light components that orthogonally intersect this axis of transmission.

Here, as illustrated in FIG. 3, particularly in a case in which the display panel 20 of an image display device 200 is a liquid crystal display panel 20a, the display light emitted from the liquid crystal display panel 20a is polarized.

Therefore, when the surface protection film 10 is attached such that the axis of transmission of the reflective polarizing film 12a coincides with the axis of polarization of the display light emitted from the liquid crystal display panel 20a, the transmittance of the display light would be increased theoretically up to 100% in the image display state, while the reflectance of external light would be increased theoretically up to 50% in the mirror state.

The details will be described in the second embodiment.

(3) Multilayer Structure

Furthermore, it is preferable that a resin film having a multilayer structure in which a large number of layers having a relatively low refractive index (hereinafter, may be referred to as "low refractive index layers") and a large number of layers having a relatively high refractive index (hereinafter, may be referred to as "high refractive index layers") are alternately laminated, is employed.

The reason for this is that when such a resin film having a multilayer structure is used, the resin film would be used as an optical interference film that selectively reflects or transmits light having a particular wavelength as a result of structural light interference between layers, and such a resin film would be suitably used as the resin film of the present invention.

That is, when such a resin film having a multilayer structure is used, reflectance would be appropriately increased by gradually changing the film thicknesses of various layers, or by laminating a film having a different reflection peak.

Meanwhile, from the viewpoint of display operability, it is preferable that the deposited metal layer does not exist.

To describe more specifically, in regard to a multilayer-structured resin film in which layers generally having a layer thickness of 0.05 to 0.5 μm and having different refractive indices are alternately laminated, a phenomenon called augmented reflection of reflecting light having a specific wavelength is observed depending on the refractive index difference between a layer constituting one layer and a layer constituting another layer, the film thickness, and the number of laminated layers. Generally, the reflection wavelength is represented by the following Formula (1):

$$\lambda = 2(n_1 \times d_1 + n_2 \times d_2) \quad (1)$$

In the Formula (1), λ, represents the reflection wavelength (nm); $n_1$ and $n_2$ each represent the refractive index of a layer; and $d_1$ and $d_2$ respectively represent the thickness (nm) of a layer.

Furthermore, when a resin having a positive stress-optic coefficient is used in one layer, anisotropy is imparted to the layer by converting the refractive index of such a layer into a birefringence by stretching the layer in a uniaxial direction, and the refractive index difference between layers in the direction of stretching in the film plane is made large, while the refractive index difference between layers in a direction orthogonal to the direction of stretching in the film plane is made small. Thereby, only particular polarized light components would be reflected.

Therefore, a reflective polarizing film that reflects polarized light components in one direction and transmits polarized light components in a direction orthogonal thereto would be obtained, and in that case, the birefringence is generally represented by the following Formula (2):

$$n_{1X} > n_{2X}, n_{1Y} = n_{2Y} \quad (2)$$

In the Formula (2), $n_{1X}$ and $n_{2X}$ each represent the refractive index in the direction of stretching; and $n_{1Y}$ and $n_{2Y}$ each represents the refractive index of each layer in a direction orthogonally intersecting the direction of stretching.

Furthermore, examples of the combination of high refractive index layer/low refractive index layer include PEN/coPEN, PET/coPEN, PEN/sPS, PEN/EASTAR, PET/EASTAR, PET/ECDEL, PEN/ECDEL, PEN/THV, and PEN/coPET.

Meanwhile, "EASTAR" is polycyclohexanedimethyl terephthalate (manufactured by Eastman Chemical Company), "ECDEL" is a thermoplastic polyester (manufactured by Eastman Chemical Company), "THV" is a fluoropolymer (manufactured by 3M Company), and "coPET" is a copolymer based on terephthalic acid.

Furthermore, regarding a commercially available reflective polarizing film, for example, DBEF series manufactured by 3M Company may be employed.

Figure 1B:
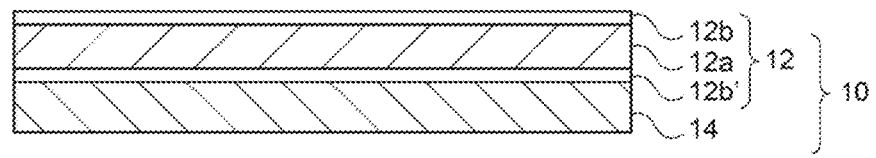

Furthermore, as illustrated in FIG. 1(b), it is also preferable that the resin film 12 includes auxiliary base material layers (12b, 12b') formed from a resin or glass, in addition to the layers for manifesting optical functions, such as the reflective polarizing film 12a, from the viewpoint of enhancing the surface protective function or handleability.

In this case, the auxiliary base material layers may be provided only on one surface of a layer for manifesting an optical function, or may be provided on both surfaces.

Examples of such auxiliary base material layers include, but are not particularly limited to, a polyester film, a polyolefin film, a polycarbonate film, and a glass plate.

(4) Thickness

It is preferable that the thickness of the resin film is set to a value within the range of 5 to 100 μm.

The reason for this is that if the thickness of the resin film has a value of below 5 μm, it may be difficult to obtain sufficient optical characteristics, or the surface protective function may be excessively deteriorated. On the other hand, it is because if the thickness of the resin film has a value of above 100 μm, the relative permittivity increases excessively high, and when the surface protection film is attached on the viewer's side of a capacitive touch panel, display operability may be deteriorated.

Therefore, it is more preferable that the lower limit of the thickness of the resin film is set to a value of 10 μm or more, and even more preferably, to a value of 15 μm or more.

Furthermore, it is more preferable that the upper limit of the thickness of the resin film is set to a value of 60 μm or less, and even more preferably, to a value of 40 μm or less.

2. Pressure-Sensitive Adhesive Layer (1) Relative Permittivity

It is preferable that in regard to the pressure-sensitive adhesive layer according to the present invention, the relative permittivity (or dielectric constant) measured at a frequency of 1 MHz is set to a value within the range of 2 to 5.

The reason for this is that if the relative permittivity of the pressure-sensitive adhesive layer has a value of below 2, there may be excessive limitations on the pressure-sensitive adhesive that would be used. On the other hand, it is because if the relative permittivity of the pressure-sensitive adhesive layer has a value of above 5, in a case in which the surface protection film is attached on the viewer's side of a capacitive touch panel, display operability may be deteriorated.

Therefore, it is more preferable that the lower limit of the relative permittivity of the pressure-sensitive adhesive layer as measured at a frequency of 1 MHz is set to a value of 2.4 or more, and even more preferably, to a value of 2.8 or more.

Furthermore, it is more preferable that the upper limit of the relative permittivity of the pressure-sensitive adhesive layer as measured at a frequency of 1 MHz is set to a value of 4.6 or less, and even more preferably, to a value of 4.2 or less.

(2) Type

Furthermore, there are no particular limitations on the type (kind) of the pressure-sensitive adhesive; however, it is preferable to use an acrylic pressure-sensitive adhesive or a silicone-based pressure-sensitive adhesive.

The reason for this is that the aforementioned pressure-sensitive adhesives have excellent optical characteristics, and the adhesive force is easily adjustable.

Furthermore, the acrylic pressure-sensitive adhesive is not particularly limited; however, it is preferable that the acrylic pressure-sensitive adhesive includes, for example, a (meth)acrylic acid ester copolymer and a crosslinking agent.

Hereinafter, the (meth)acrylic acid ester copolymer and the crosslinking agent will be respectively described.

Regarding the constituent unit of an acrylic acid ester copolymer, it is preferable that a (meth)acrylic acid ester having an alkyl group with a carbon number having a value within the range of 1 to 20.

Such a (meth)acrylic acid ester may be, for example, a compound derived from at least one of methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth)acrylate, palmityl (meth) acrylate, and stearyl (meth)acrylate. These may be used singly, or a plurality of compounds may be used in combination.

Furthermore, it is preferable that the (meth)acrylic acid ester copolymer includes a vinyl monomer having a functional group in the molecule.

For example, it is preferable that the vinyl monomer includes at least one of a hydroxyl group, a carboxyl group, an amino group, and an amide group as a functional group, and specific examples thereof include (meth)acrylic acid hydroxyalkyl esters such as 2-hydroxyethyl (meth)acrylate, 2-hydroxypropyl (meth)acrylate, 3-hydroxypropyl (meth) acrylate, 2-hydroxybutyl (meth)acrylate, 3-hydroxybutyl (meth)acrylate, and 4-hydroxybutyl (meth)acrylate; acrylamides such as acrylamide, methacrylamide, N-methyl acrylamide, N-methyl methacrylamide, N-methylol acrylamide, and N-methylol methacrylamide; monoalkylaminoalkyl (meth) acrylates such as monomethylaminoethyl (meth) acrylate, monoethylaminoethyl (meth) acrylate, monomethylaminopropyl (meth) acrylate, and monoethylaminopropyl (meth)acrylate; and ethylenically unsaturated carboxylic acids such as acrylic acid, methacrylic acid, crotonic acid, maleic acid, itaconic acid, and citraconic acid. These may be used singly, or a plurality of compounds may be used in combination.

Furthermore, in regard to the (meth)acrylic acid ester polymer, it is preferable that the amount of incorporation of the (meth)acrylic acid ester monomer having an alkyl group with a carbon number having a value within the range of 1 to 20 is set to a value within the range of 70% to 99.5% by weight, more preferably to a value within the range of 80% to 99% by weight, and even more preferably to a value within the range of 90% to 98.5% by weight, with respect to the total amount of monomer components when copolymerization is performed.

On the other hand, regarding the vinyl monomer having a functional group in the molecule, it is preferable that the amount of incorporation thereof is set to a value within the range of 0.5% to 30% by weight, more preferably to a value within the range of 1% to 20% by weight, and particularly preferably to a value within the range of 1.5% to 10% by weight.

The (meth)acrylic acid ester having an alkyl group with a carbon number having a value within the range of 1 to 20 means, for example, a (meth)acrylic acid ester that does not have a hydroxyl group, a carboxyl group, an amino group and an amide group in the molecule, as in the case of methyl (meth)acrylate.

Also, the copolymerization ratio mentioned above represents a theoretical value calculated from the feed amounts of the various monomers as constituent units.

There are no particular limitations on the mode of copolymerization, and the copolymer may be any one of a random copolymer, a block copolymer, and a graft copolymer.

It is preferable that the weight average molecular weight of the (meth)acrylic acid ester copolymer is set to a value within the range of 50,000 to 2,200,000, more preferably to a value within the range of 100,000 to 1,000,000, and even more preferably to a value within the range of 150,000 to 300,000.

Preferred examples of the crosslinking agent include an isocyanate-based crosslinking agent, an epoxy-based crosslinking agent, an acridine-based crosslinking agent, and a metal chelate-based crosslinking agent, and particularly, an isocyanate-based crosslinking agent is preferred.

Such an isocyanate-based crosslinking agent includes at least a polyisocyanate compound.

More specific examples include aromatic polyisocyanates such as tolylene diisocyanate, diphenylmethane diisocyanate, and xylene diisocyanate; aliphatic polyisocyanates such as hexamethylene diisocyanate; alicyclic polyisocyanates such as isophorone diisocyanate and hydrogenated diphenylmethane diisocyanate; biuret forms and isocyanurate forms thereof; and adducts thereof, which are reaction products thereof with low molecular weight, active hydrogen-containing compounds such as ethylene glycol, propylene glycol, neopentyl glycol, trimethylolpropane, and castor oil.

Furthermore, it is preferable that the amount of incorporation of the crosslinking agent is set to a value within the range of 0.01 to 20 parts by weight, more preferably to a value within the range of 0.1 to 10 parts by weight, and even more preferably to a value within the range of 1 to 5 parts by weight, with respect to 100 parts by weight of the (meth)acrylic acid ester copolymer.

Furthermore, there are no particular limitations on the silicone-based pressure-sensitive adhesive; however, it is preferable to use various silicone rubbers containing organopolysiloxanes as constituent units.

Furthermore, examples of the organic group of the organopolysiloxanes include hydrocarbon groups such as an alkyl group, an aryl group, and an alkenyl group.

Examples of the alkyl group include methyl, ethyl, and propyl; examples of the aryl group include a phenyl group; and examples of the alkenyl group include a vinyl group, an allyl group, a butenyl group, and a hexenyl group. However, from the viewpoint of having adequate microadhesiveness and repeelability, an addition type organopolysiloxane having an alkenyl group, particularly a vinyl group, is suitably used.

The degree of polymerization of the organopolysiloxane is not particularly limited; however, the degree of polymerization is usually 500 to 10,000, and preferably 2,000 to 8,000.

In a case in which an addition type organopolysiloxane is used, it is preferable to use a platinum catalyst in an amount within the range of 0.01 to 3 parts by mass, and particularly 0.05 to 2 parts by mass, with respect to 100 parts by mass of the addition type organopolysiloxane.

Examples of such a platinum catalyst include platinum black, platinic chloride, chloroplatinic acid, a reaction product between chloroplatinic acid and a monohydric alcohol, a complex of chloroplatinic acid and an olefin compound, and platinum bisacetoacetate.

Furthermore, various silicone resins that are used in silicone-based pressure-sensitive adhesives, namely, branched organopolysiloxanes containing a hydroxyl group bonded to a silicon atom in the molecule, would be incorporated into the organopolysiloxane, in order to increase the adhesive force.

The content thereof is preferably set to a value of 50 parts by weight or less, and particularly, to a value within the range of 5 to 20 parts by weight, with respect to 100 parts by weight of the organopolysiloxane.

(3) Thickness

It is also preferable that the thickness of the pressure-sensitive adhesive layer is set to a value within the range of 5 to 300 μm.

The reason for this is that if the thickness of the pressure-sensitive adhesive layer has a value of below 5 μm sufficient adhesive force may not be obtained. On the other hand, it is because if the thickness of the pressure-sensitive adhesive layer has a value of above 300 μm, the relative permittivity increases excessively, and when the surface protection film is attached on the viewer's side of a capacitive touch panel, display operability may be deteriorated.

Therefore, it is more preferable that the lower limit of the thickness of the pressure-sensitive adhesive layer is set to a value of 10 μm or more, and even more preferably, to a value of 15 μm or more.

Furthermore, it is more preferable that the upper limit of the thickness of the pressure-sensitive adhesive layer is set to a value of 100 μm or less, and even more preferably, to a value of 50 μm or less.

(4) Adhesive Force

It is preferable that the adhesive force (or peel adhesion) of the pressure-sensitive adhesive layer is set to a value within the range of 0.1 to 50 N/25 mm.

The reason for this is that if the adhesive force of the pressure-sensitive adhesive layer has a value of below 0.1 N/25 mm, the surface protection film may become easily detachable from the surface of a capacitive touch panel or the like. On the other hand, it is because if the adhesive force of the pressure-sensitive adhesive layer has a value of above 50 N/25 mm, re-adhering may be difficult.

Therefore, it is more preferable that the lower limit of the adhesive force of the pressure-sensitive adhesive layer is set to a value of 1 N/25 mm or more, and even more preferably, to a value of 3 N/25 mm or more.

Furthermore, it is more preferable that the upper limit of the adhesive force of the pressure-sensitive adhesive layer is set to a value of 25 N/25 mm or less, and even more preferably to a value of 10 N/25 mm or less.

3. Optical Characteristics (1) Reflectance

Regarding the surface protection film of the present invention, it is preferable that the reflectance for light having a wavelength of 555 nm is set to a value within the range of 20% to 80%.

The reason for this is that if such reflectance of the surface protection film has a value of below 20%, when a mirror state is attained in a situation where there is no display light coming from the display panel, it may be difficult to visually recognize a reflected image. On the other hand, it is because if such reflectance of the surface protection film has a value of above 80%, when an image is displayed by transmitting display light coming from the display panel, the reflected light may excessively interfere with the display light, and thereby it may become difficult to visually recognize the image.

Therefore, it is more preferable that the lower limit of the reflectance of the surface protection film for light having a wavelength of 555 nm is set to a value of 35% or more, and even more preferably, to a value of 45% or more.

Also, it is more preferable that the upper limit of the reflectance of the surface protection film for light having a wavelength of 555 nm is set to a value of 65% or less, and even more preferably, to a value of 55% or less.

Regarding the surface protection film of the present invention, it is preferable that the average reflectance for light having a wavelength of 370 to 810 nm is set to a value within the range of 20% to 80%.

The reason for this is that if such average reflectance of the surface protection film has a value of below 20%, when a mirror state is attained in a situation where there is no display light coming from the display panel, it may be difficult to visually recognize a portion of the colors that constitute a reflected image. On the other hand, it is because if such average reflectance of the surface protection film has a value of above 80%, when an image is displayed by transmitting display light coming from the display panel, the reflected light may excessively interfere with the display light, and thereby it may be difficult to visually recognize the image.

Therefore, it is more preferable that the lower limit of the average reflectance of the surface protection film for light having a wavelength of 370 to 810 nm is set to a value of 35% or more, and even more preferably, to a value of 45% or more.

Also, it is more preferable that the upper limit of the average reflectance of the surface protection film for light having a wavelength of 370 to 810 nm to a value of 65% or less, and even more preferably, to a value of 55% or less.

(2) Transmittance

Regarding the surface protection film according to the present invention, it is preferable that the transmittance for light having a wavelength of 555 nm is set to a value within the range of 20% to 80%.

The reason for this is that if such transmittance of the surface protection film has a value of below 20%, when an image is displayed by transmitting display light coming from the display panel, it may be difficult to visually recognize the image. On the other hand, if such transmittance of the surface protection film has a value of above 80%, the reflected light intensity may be decreased, and the function as a mirror may be impaired.

Therefore, it is more preferable that the lower limit of the transmittance of the surface protection film for light having a wavelength of 555 nm is set to a value of 35% or more, and even more preferably to a value of 45% or more.

Furthermore, it is more preferable that the upper limit of the transmittance of the surface protection film for light having a wavelength of 555 nm is set to a value of 65% or less, and even more preferably, to a value of 55% or less.

Regarding the surface protection film according to the present invention, it is preferable that the average transmittance for light having a wavelength of 370 to 810 nm is set to a value within the range of 20% to 80%.

The reason for this is that if such average transmittance of the surface protection film has a value of below 20%, when an image is displayed by transmitting display light coming from the display panel, it may be difficult to visually recognize a portion of the colors that constitute the display image. On the other hand, if such average transmittance of the surface protection film has a value of above 80%, the reflected light intensity is decreased, and the function as a mirror may become unsatisfactory.

Therefore, it is more preferable that the lower limit of the average transmittance of the surface protection film for light having a wavelength of 370 to 810 nm is set to a value of 35% or more, and even more preferably, to a value of 45% or more.

Furthermore, it is more preferable that the upper limit of the average transmittance of the surface protection film for light having a wavelength of 370 to 810 nm is set to a value of 65% or less, and even more preferably, to a value of 55% or less.

Meanwhile, in regard to the total light transmittance, it is preferable that the total light transmittance is set to a value within the range of 10% to 90%, and even more preferably, to a value within the range of 45% to 60%.

In regard to the haze value, it is preferable that the haze value is set to a value within the range of 0.01% to 10%, and even more preferably, to a value within the range of 0.1% to 1.0%.

4. Release Sheet

Figure 1C:
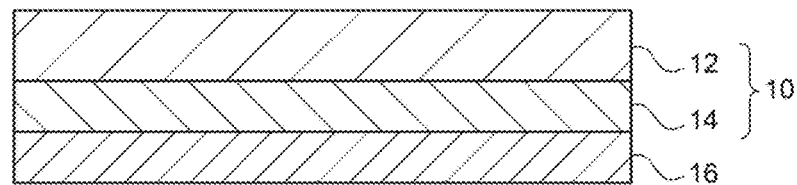

Furthermore, as illustrated in FIG. 1(c), it is preferable that a release sheet 16 is laminated on an exposed surface of the pressure-sensitive adhesive layer 14 of the surface protection film 10.

Examples of the material for the release sheet include polyethylene terephthalate, polyethylene, and polypropylene, and regarding the thickness, it is preferable that the thickness is set to a value within the range of 5 to 200 μm, and even more preferably, to a value within the range of 10 to 100 μm.

5. Other Applications

Since the surface protection film of the present invention is intended for being attached on the viewer's side of a capacitive touch panel, it is essential that the surface protection film has a predetermined relative permittivity in order to maintain display operability.

However, it is needless to say that the surface protection film of the present invention would realize conversion between an image display state and a mirror state even in a case in which the surface protection film is used for applications other than a capacitive touch panel, for example, in a case in which the surface protection film is attached directly to the surface of a liquid crystal display.

Therefore, in a case in which the applications are not particularly limited, the following invention in which the configuration requirement for relative permittivity is excluded from the configuration requirements of the present invention, is also valid.

"A surface protection film for a display, the surface protection film including a resin film and a pressure-sensitive adhesive, in which the reflectance of the resin film for light having a wavelength of 555 nm is set to a value within the range of 40% to 60%, and the transmittance for light having a wavelength of 555 nm is set to a value within the range of 40% to 60%."

Specific matters of such an invention are the same as the matters other than the matters related to relative permittivity according to the present specification, and the effects of such an invention are the same as the effects of the present invention, except that display operability required when the surface protection film is applied to a capacitive touch panel is not required.

[Second Embodiment]

The second embodiment of the present invention is a surface protection film-attached image display device, the image display device having incorporated therein a capacitive touch panel formed by laminating a position input device on the viewer's side of a display panel, in which the surface protection film according to the first embodiment is attached on the viewer's side surface.

Hereinafter, the image display device according to the second embodiment of the present invention will be specifically described with reference to the drawings as appropriate.

In addition, a capacitive touch panel formed by attaching the surface protection film of the first embodiment on the viewer's side, which is still another embodiment of the present invention, will be described together as a part of the second embodiment.

As illustrated in FIG. 3, the surface protection film-attached image display device 300 according to the present embodiment is formed by laminating the surface protection film 10 that has been described as the first embodiment, a transparent protection plate 40, and a capacitive touch panel 100 having a position input device 30 and a display panel 20 are laminated in this order, with lamination starting from the viewer's side.

Instead of being attached on the viewer's side of the transparent protection plate 40, the surface protection film 10 may be attached on the side of the position input device 30 of the transparent protection plate 40, may be attached on the viewer's side surface of the position input device 30, or may be attached on the liquid crystal display panel 20 side of the position input device 30.

However, in these cases, it is necessary to perform the attachment within the production process for the image display device 200.

Therefore, in order to make the surface protection film 10 freely removable from the image display device 200 by the user, as illustrated in FIG. 3, it is preferable that the surface protection film 10 is attached on the viewer's side of the transparent protection plate 40, that is, on the outermost surface of the viewer's side of the image display device 200.

Further description on the surface protection film 10 will not be repeated here, in order to avoid redundancy.

Examples of the transparent protection plate 40 include a glass plate, an acrylic resin plate, a polycarbonate resin plate, and a polyester resin plate.

The position input device 30 is usually configured to include an X-electrode and a Y-electrode, both being formed from a transparent conductive film. To be more specific, there are position input devices of a type in which the X-electrode and the Y-electrode are formed on one base material, and position input devices of a type in which the X-electrode and the Y-electrode are separately formed on two base materials. However, any of these types may be used for the present invention.

Examples of the display panel 20 include a liquid crystal display panel 20a, a plasma display panel, and an organic EL display panel.

Furthermore, it is preferable that the display panel 20 is a liquid crystal display panel 20a, and the resin film 12 in the surface protection film 10 includes a reflective polarizing film 12a, while the surface protection film 10 is attached such that the axis of transmission of the reflective polarizing film 12a coincides with the axis of polarization of the light emitted from the liquid crystal display panel 20a.

The reason for this is that in the image display state, an image would be stably displayed by efficiently transmitting display light; and in the mirror state, a clear reflected image would be obtained by efficiently reflecting external light.

That is, as illustrated in FIG. 3, since the display light emitted from the liquid crystal display panel 20a is polarized light, when the surface protection film 10 is attached such that the axis of transmission of the reflective polarizing film 12a coincides with the axis of polarization of the display limit emitted from the liquid crystal display panel 20a, the transmittance of the display light would be effectively increased.

In the following description, the surface protection film-attached image display device 300 in which the display panel 20 is a liquid crystal display panel 20a, and the resin film in the surface protection film 10 is a reflective polarizing film 12a, will be specifically described separately in connection with the image display state and the mirror state.

Regarding the type of the liquid crystal, the description will be based on a liquid crystal display panel using a twist nematic (NT) type liquid crystal.

(Image Display State)

First, in the image display state, light emitted from the backlight 28 of the liquid crystal display panel 20a through the viewer's side is such that second linearly polarized light is absorbed by a first absorption type polarizing plate 24, and only first linearly polarized light penetrates into the liquid crystal layer 22.

At this time, in the image display state, for the light corresponding to the bright display portion in a display image, since the voltage applied to the transparent electrode (not shown in the diagram) is controlled to an OFF state, the axis of polarization changes by 90° due to the liquid crystal layer 22. Meanwhile, for the light corresponding to the dark display portion of the display image, since the voltage applied is controlled to an ON state, the axis of polarization does not change.

Therefore, with regard to the first linearly polarized light that has been transmitted through the first absorption type polarizing plate 24, the light corresponding to the bright display portion in the display image becomes the second linearly polarized light that orthogonally intersects the first linearly polarized light in the liquid crystal layer 22.

Here, since the axis of transmission of the second absorption type polarizing plate 26 is arranged so as to orthogonally intersect the axis of transmission of the first absorption type polarizing plate, the second linearly polarized light that has been transmitted through the liquid crystal layer 22 is transmitted through the second absorption type polarizing plate 26.

Accordingly, the display light emitted from the liquid crystal display panel 20a is composed of the second linearly polarized light.

Next, the second linearly polarized light emitted from the liquid crystal display panel 20a is directly transmitted through the position input device 30 and the transparent protection plate 40, and reaches the surface protection film 10 that includes a reflective polarizing film 12a as a resin film.

At this time, when the reflective polarizing film 12a is attached such that the axis of transmission of the reflective polarizing film 12a coincides with the axis of polarization of the light emitted from the liquid crystal display panel 20a, the display light composed of the second linearly polarized light, which is emitted from the liquid crystal display panel 20a, is directly transmitted, theoretically 100%, through the surface protection film 10 and is visually recognized by the viewer.

(Mirror State)

Next, in the mirror state, external light enters the surface protection film 10; however, since the external light is natural light and includes 50% of first linearly polarized light and 50% of second linearly polarized light, only the first linearly polarized light is reflected, while the second linearly polarized light is transmitted.

Therefore, the second linearly polarized light that has been transmitted through the surface protection film is transmitted through the transparent protection plate 40 and the position input device 30, and then enters the liquid crystal display panel 20a.

At this time, since the state of the liquid crystal layer 22 is the same as the state in the case of the bright display portion of the image display state, the second linearly polarized light is respectively transmitted through the second absorption type polarizing plate 26, the liquid crystal layer 22, and the first absorption type polarizing plate 24 and reaches the backlight 28, where the second linearly polarized light is scattered and dissipated.

Meanwhile, with regard to the external light that has entered, since the first linearly polarized light is to be theoretically completely reflected, theoretically 50% of light is visually recognized by the viewer as a reflected image.

Furthermore, in a case in which the display panel is other than a liquid crystal display panel, it is also preferable that the resin film in the surface protection film does not include a reflective polarizing film.

The reason for this is that since the display light emitted from a display panel other than a liquid crystal display panel is not polarized light, in the display light coming from the display panel, the light having an axis of polarization that does not coincide with the axis of transmission of the reflective polarizing film is reflected on the display panel, and it may be difficult to display an image stably.

Therefore, in a case in which the display panel is other than a liquid crystal display panel, it is also preferable to use a resin film that does not have light polarization characteristics.

EXAMPLES

Hereinafter, the surface protection film of the present invention and the like will be described in more detail with reference to Examples.

Example 1

1. Production of Surface Protection Film (1) Preparation of Resin Film

A reflective polarizing film (manufactured by 3M Company, APF-v4) having a thickness of 15 μm was prepared as a resin film.

Furthermore, for the reflective polarizing film thus prepared, the reflectance (%) and transmittance (%) for light having a wavelength of 555 nm, and the average reflectance (%) and the average transmittance (%) for visible light (light having a wavelength of 370 to 810 nm) were measured using an ultraviolet-visible-near infrared spectrophotometer (manufactured by Shimadzu Corp., UV-3600).

At this time, measurement was performed by having a super birefringence film (SRF) disposed on the measured surface side of the reflective polarizing film, so that the value would not be changed by the axis of polarization. The values thus obtained are presented in Table 1, and a wavelength-reflectance chart thus obtained is presented as the characteristic curve A in FIG. 4(a), while a wavelength-transmittance chart thus obtained is presented as the characteristic curve A in FIG. 4(b).

Furthermore, the total light transmittance (%) was measured according to JIS K 7361, and the haze value (%) was measured according to JIS K 7163. The results thus obtained are presented in Table 1.

The reflectance (%) for light having a wavelength of 555 nm was measured as follows.

Figure 4A:
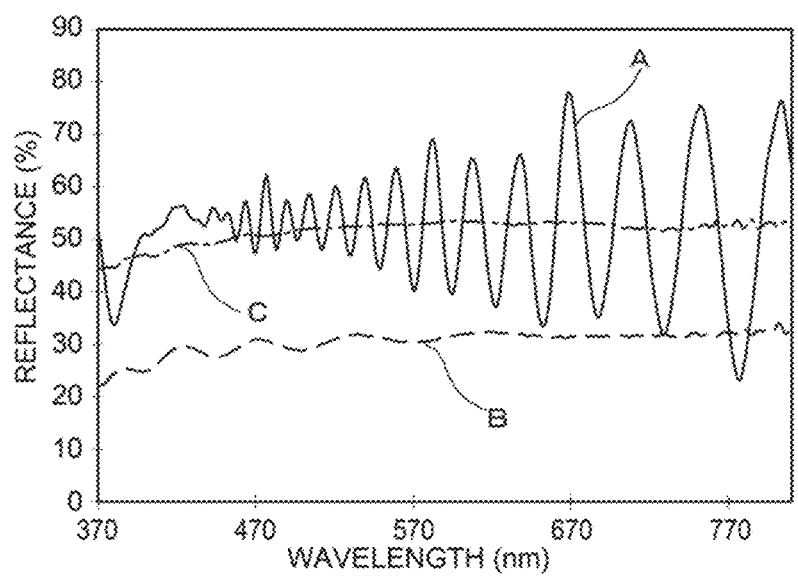
FIG. 4(a) is a wavelength-reflectance chart for resin films used in Examples 1 to 3 and Comparative Examples 1 and 2.
Figure 5A:
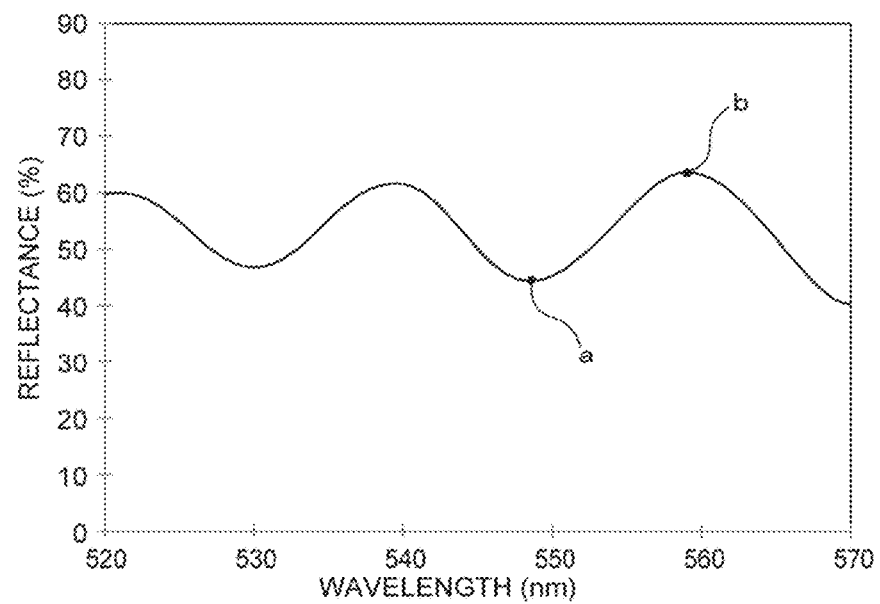
FIGS. 5(a) and 5(b) are diagrams provided in order to describe a method for determining reflectance and transmittance for light having a wavelength of 555 nm.

That is, first, as illustrated in FIG. 5(a) in which the wavelength range for the characteristic curve A of FIG. 4(a) is limitedly magnified, the minimum peak a and the maximum peak b that exist on both sides of the wavelength of 555 nm in the characteristic curve A were identified.

Next, the average value of the reflectances (%) for the minimum peak a and the maximum peak b thus identified was calculated, and the value thus obtained was designated as the reflectance (%) for light having a wavelength of 555 nm.

Figure 4B:
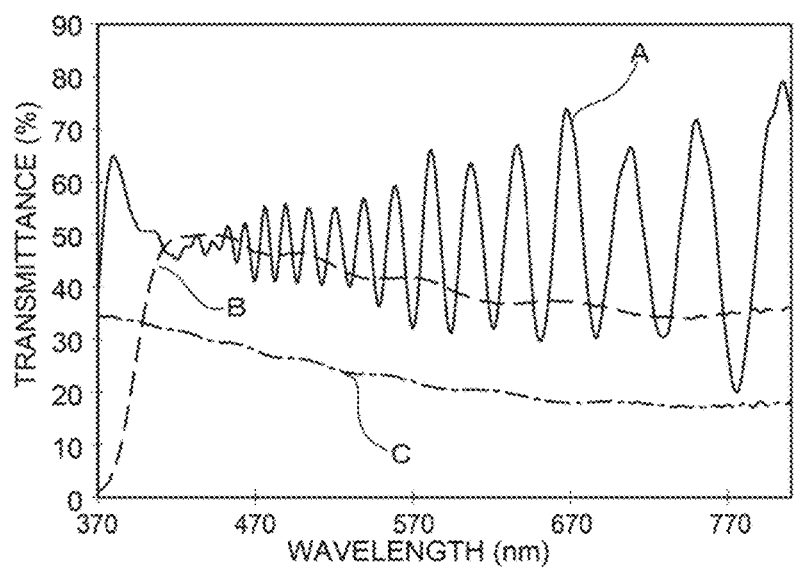
FIG. 4(b) is a wavelength-transmittance chart for resin films used in Examples 1 to 3 and Comparative Examples 1 and 2.
Figure 5B:
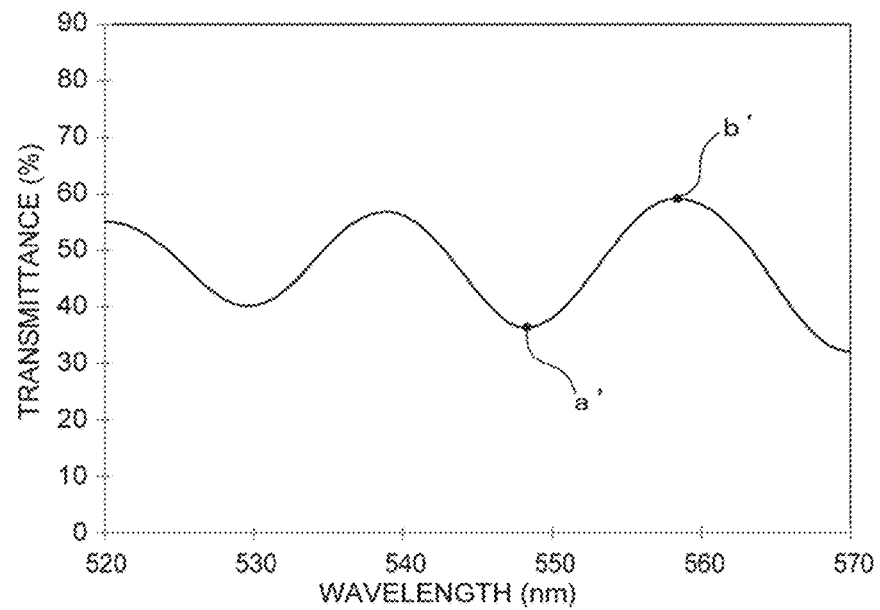

Furthermore, the same was performed also for the transmittance (%) for light having a wavelength of 555 nm, and as illustrated in FIG. 5(b) in which the wavelength range for the characteristic curve A of FIG. 4(b) is limitedly magnified, the minimum peak a' and the maximum peak b' that exist on both sides of the wavelength of 555 nm in the characteristic curve A were identified.

Next, the average value of the transmittances (%) for the minimum peak a' and the maximum peak b' thus identified was calculated, and the value thus obtained was designated as the transmittance (%) for light having a wavelength of 555 nm.

The reason why the values were calculated as such is that although the spectrum is observed as an undulating spectrum in this measurement due to light interference; however, it is speculated that in reality, a spectrum that averages this undulating spectrum is obtained.

The relative permittivity of the reflective polarizing film thus prepared was measured by the following method.

That is, 10 sheets of the reflective polarizing film were laminated, and this was used as a measurement sample.

Next, a dielectric test fixture (manufactured by Agilent Technologies, Inc., AGILENT 16451B) is connected to a LCR/resistance meter (manufactured by Agilent Technologies, Inc., impedance/gain phase analyzer 4194A), and capacitance C (F) of the measurement sample at a frequency of 1 MHz was measured.

Next, the capacitance C' (F) of one sheet of the reflective polarizing film was calculated using the following Formula (3), and then the relative permittivity $\varepsilon_r$ of the reflective polarizing film measured at a frequency of 1 MHz was calculated using the following Formula (4). The results thus obtained are presented in Table 1.

$$\frac{1}{C} = \frac{10}{C'} \Leftrightarrow C' = 10C \quad (3)$$

In the Formula (3), C represents the capacitance (F) of the measurement sample, and C' represents the capacitance (F) of the reflective polarizing film.

$$C' = \varepsilon_0 \varepsilon_r \frac{S}{d} = \varepsilon_0 \varepsilon_r \frac{\pi \times (L/2)^2}{d} \Leftrightarrow \varepsilon_r = \frac{d \times C'}{\pi \times (L/2)^2 \times \varepsilon_0} \quad (4)$$

In the Formula (4), C' represents the capacitance (F) of the reflective polarizing film; d represents the thickness (m) of the reflective polarizing film; L represents the diameter of the measurement electrode=0.005 (m); and $\varepsilon_0$ represents the permittivity of vacuum=$8.854 \times 10^{-12}$ (F/m).

(2) Production of Pressure-Sensitive Adhesive Layer 67 parts by weight of 2-ethylhexyl acrylate, 30 parts by weight of butyl acrylate, 1 part by weight of 2-hydroxyethyl acrylate, and 2 parts by weight of acrylic acid were copolymerized in the presence of 2,2'-azobisisobutyronitrile and 2-mercaptoethanol, and thereby an acrylic copolymer having a weight average molecular weight of 200,000 was obtained.

The weight average molecular weight of the acrylic copolymer thus obtained is a weight average molecular weight measured using gel permeation chromatography (GPC) under the following conditions (GPC measurement) and calculated relative to polystyrene standards.

<Measurement Conditions>
GPC analyzer: manufactured by Tosoh Corp., HLC-8020
GPC column (passed in the following order): manufactured by Tosoh Corp.
  TSK guard column HXL-H
  TSK gel GMHXL (×2)
  TSK gel G2000HXL
Measurement solvent: tetrahydrofuran
Measurement temperature: 40° C.

Next, 100 parts by weight (representing the value calculated relative to the solid content; hereinafter, the same) of the acrylic copolymer thus obtained was mixed with 3 parts by weight of trimethylolpropane-modified tolylene diisocyanate (manufactured by Nippon Polyurethane Industry Co., Ltd., trade name: "CORONATE L"), and the mixture was diluted with toluene. Thus, a coating liquid was obtained.

Next, the coating liquid was applied using a knife coater on a release-treated surface of a heavy release type release sheet (manufactured by Lintec Corp., SP-PET2150, thickness: 38 μm) obtained by release-treating one surface of a polyethylene terephthalate film with a silicone-based release agent, and then the release sheet was heat-treated for 1 minute at 90° C. After heating, the coated surface was bonded to a light release type release sheet (manufactured by Lintec Corp., SP-PET1130, thickness: 38 μm) obtained by release-treating one surface of a polyethylene terephthalate film with a silicone-based release agent, such that the coated surface would come into contact with the release-treated surface side, and the assembly was cured for 7 days at 25° C. Thereby, an acrylic pressure-sensitive adhesive layer sandwiched between release films on both surfaces was formed.

The thickness of the acrylic pressure-sensitive adhesive layer thus obtained was 25 μm. The thickness of the pressure-sensitive adhesive layer was measured using a simple type digital length measuring system (manufactured by Nikon Corp., DIGIMICRO MH-15M).

The relative permittivity of the pressure-sensitive adhesive layer thus obtained was measured in the same manner as in the case of the reflective polarizing film. The values thus obtained are presented in Table 1.

(3) Laminating of Pressure-Sensitive Adhesive Layer

Next, the light release type release sheet was peeled off from the pressure-sensitive adhesive layer in a state of being sandwiched between two sheets of release films, and then the exposed surface of the pressure-sensitive adhesive layer was laminated to the reflective polarizing film. Thus, a surface protection film was obtained.

Furthermore, the heavy release type release sheet was peeled off from the surface protection film thus obtained, and the reflectance (%) and transmittance (%) for light having a wavelength of 555 nm, and the average reflectance (%) and the average transmittance (%) for visible light (light having a wavelength of 370 to 810 nm) were measured in the same manner as in the case of the reflective polarizing film. The values thus obtained are presented in Table 1, and also, a wavelength-reflectance chart thus obtained is presented as the characteristic curve A in FIG. 6(a), while a wavelength-transmittance chart thus obtained is presented as the characteristic curve A in FIG. 6(b).

The total light transmittance (%) was measured according to JIS K 7361, and the haze value (%) was measured according to JIS K 7163. The results thus obtained are presented in Table 1.

2. Attachment to Image Display Device

Next, the surface protection film thus obtained was cut into a square having a size of 30 mm×30 mm, and then the heavy release type release sheet was peeled off. The surface protection film was attached to the display surface of an image display device (manufactured by Apple, Inc., iPad (registered trademark) Air 2) having mounted thereon a capacitive touch panel comprising a position input device and a liquid crystal display panel.

At this time, the surface protection film was attached and laminated such that the axis of transmission of the reflective polarizing film in the surface protection film would coincide with the axis of polarization of display light emitted from the liquid crystal display panel.

3. Evaluations
   (1) Evaluations of Image Display State
   (1)-1 Measurement of Luminance The image display device having the surface protection film attached thereon was turned on so as to attain an image display state of displaying a predetermined image, and the luminance (cd/cm$^2$) of the display light at this time was measured using a color and luminance meter (manufactured by Konica Minolta, Inc., CS-100A). The results thus obtained are presented in Table 1.

Furthermore, luminance was also measured similarly at a site where the surface protection film was not attached, as a blank (hereinafter, may be referred to as "blank site"). The results thus obtained are presented in Table 1.

(1)-2 Evaluation by Visual Inspection

Figure 7A:
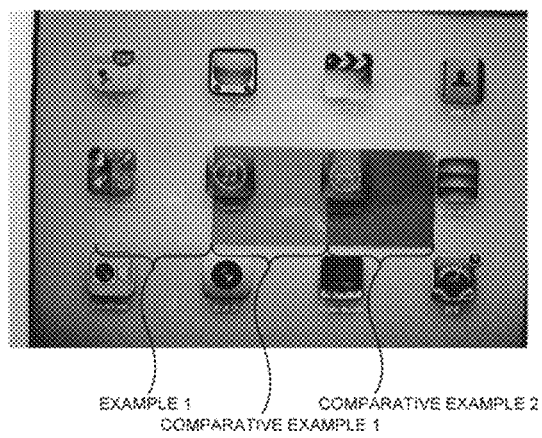
FIGS. 7(a) to 7(c) are diagrams showing photographs of the image display state and the mirror state of an image display device having a surface protection film of Example 1 or the like attached thereto.

Furthermore, the image display device having the surface protection film attached thereon was turned on so as to attain an image display state of displaying a predetermined image, and visibility at this time was evaluated by visual inspection according to the following criteria. The results thus obtained are presented in Table 1. Furthermore, a photograph of the image display device taken at this time is presented in FIG. 7(a).

◉ (Very good): Not distinguishable from a blank site.
○ (Good): Slightly darker than a blank site, but the image can be clearly recognized.
Δ (Fair): Obviously darker than a blank site, but the image can be recognized.
X (Bad): Significantly darker than a blank site, and it is difficult to recognize the image.

(2) Evaluations of Mirror State
   (2)-1 Measurement of Luminance

The image display device having the surface protection film attached thereon was turned off so as to attain a mirror state, and the luminance (cd/cm$^2$) of the reflected light of external light at this time was measured using a color and luminance meter (manufactured by Konica Minolta, Inc., CS-100A). The results thus obtained are presented in Table 1.

Furthermore, luminance was also measured similarly at a blank site as a blank. The results thus obtained are presented in Table 1.

(2)-2 Evaluation by Visual Inspection

Figure 7B:
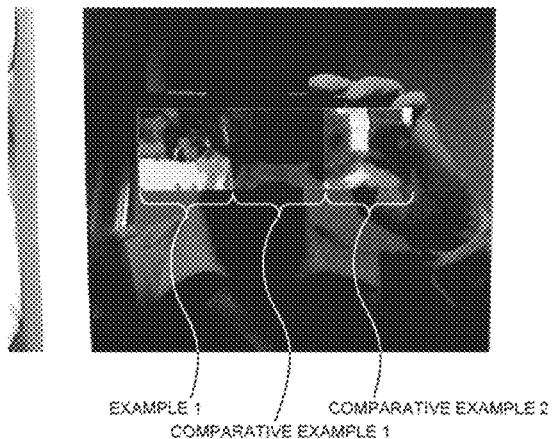

The image display device having the surface protection film attached thereon was turned off so as to attain a mirror state, and visibility at this time was evaluated by visual inspection according to the following criteria. The results thus obtained are presented in Table 1. Also, a photograph of the image display device taken at this time is presented in FIG. 7(b).

◉ (Very good): A reflected image can be recognized to the same extent as a real mirror.
○ (Good): Slightly darker than a real mirror, but a reflected image can be clearly recognized.
Δ (Fair): Obviously darker than a real mirror, but a reflected image can be recognized.
X (Bad): Significantly darker than a real mirror, and it is difficult to recognize a reflected image.

(3) Evaluation of Display Operability

The image display device having the surface protection film attached thereon was turned on so as to attain an image display state of displaying a predetermined image, and an operation of touching the image display device from above the surface protection film was performed. Thus, display operability was evaluated according to the following criteria. The results thus obtained are presented in Table 1.

◉ (Very good): A touching operation can be performed in the same manner as in the case of a blank site.
○ (Good): The sensitivity is slightly lower than that at a blank site, but a touching operation can be performed without any problem.
Δ (Fair): The sensitivity is obviously lower than that at a blank site, but a touching operation can be performed.
X (Bad): The sensitivity is significantly lower than that at a blank site, and a touching operation may not be performed.

Example 2

In Example 2, a surface protection film was produced in the same manner as in Example 1, except that when the surface protection film was produced, the pressure-sensitive adhesive layer was changed to a laminated article of an acrylic pressure-sensitive adhesive layer and a silicone-based pressure-sensitive adhesive layer, and the acrylic pressure-sensitive adhesive layer side was attached to the reflective polarizing film. Subsequently, the surface protection film was attached to an image display device and then was evaluated. The results thus obtained are presented in Table 1.

Figure 6A:
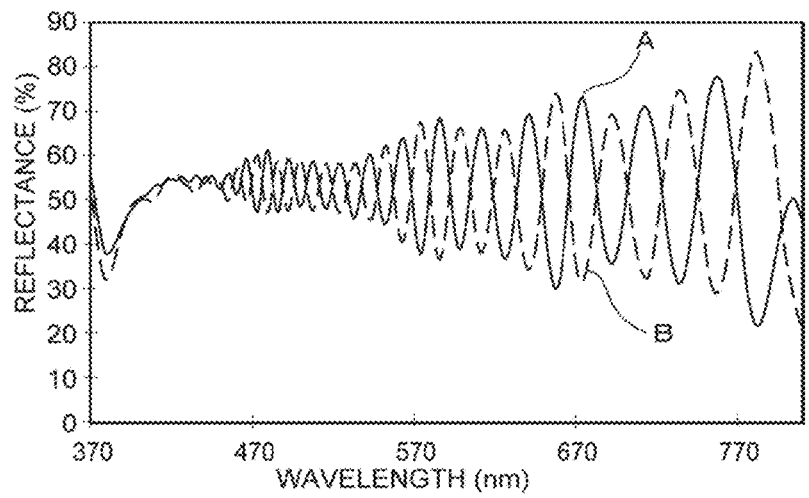
FIG. 6(a) is a wavelength-reflectance chart for the surface protection films used in examples 1 and 2.
Figure 6B:
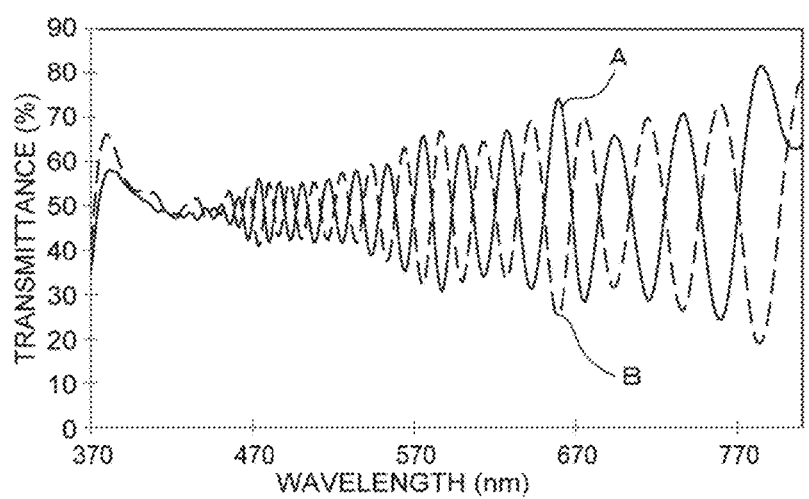
FIG. 6(b) is a wavelength-transmittance chart for the protection films used in Examples 1 and 2.

Furthermore, a wavelength-reflectance chart for the surface protection film thus obtained is presented as the characteristic curve B in FIG. 6(a), and a wavelength-transmittance chart thus obtained is presented as the characteristic curve B in FIG. 6(b).

(Pressure-Sensitive Adhesive)

A silicone solution obtained by adding 0.2 parts by mass of a platinum catalyst (manufactured by Dow Corning-Toray Co., Ltd., trade name: SRX-212) to 100 parts by weight of an addition reaction type silicone (manufactured by Shin-Etsu Chemical Co., Ltd., KS-847H), and diluting the mixture with methyl ethyl ketone to a solid content concentration of about 20% by mass, was applied on one surface of a polyethylene terephthalate film (manufactured by Toray Industries, Inc., LUMIRROR T60) having a thickness of 38 μm, and the solution was cured by heating for 2 minutes at 130° C. Thus, a silicone pressure-sensitive adhesive layer having a thickness of 30 μm was formed.

Next, an untreated polyethylene terephthalate film (manufactured by Toray Industries, Inc., LUMIRROR T60) was adhered as a release film on the silicone pressure-sensitive adhesive layer thus obtained.

Next, the light release type release sheet of the acrylic pressure-sensitive adhesive layer obtained in Example 1 was peeled off, and then the acrylic pressure-sensitive adhesive layer was attached on the uncoated surface of the polyethylene terephthalate film coated with the above-mentioned silicone solution. Thereby, a pressures-sensitive adhesive layer having a configuration of "untreated polyethylene terephthalate film/silicone-based pressure-sensitive adhesive layer (thickness 30 μm)/polyethylene terephthalate film (thickness 38 μm)/acrylic pressure-sensitive adhesive layer (thickness 25 μm)/heavy release type release film" was obtained.

Example 3

Figure 7C:
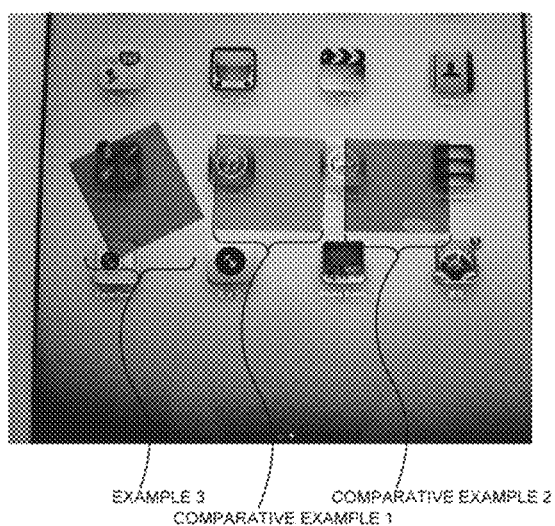

In Example 3, a surface protection film was produced in the same manner as in Example 1, except that when the surface protection film thus obtained was attached to an image display device, the axis of transmission for the reflective polarizing film was shifted by 45° from the axis of polarization of the light emitted from the display panel. Subsequently, the surface protection film was attached to an image display device and was evaluated. The results thus obtained are presented in Table 1 and FIG. 7(c).

Comparative Example 1

In Comparative Example 1, a surface protection film was produced in the same manner as in Example 1, except that when the surface protection film was produced, a half-mirror film having a deposited aluminum layer formed on the surface (manufactured by Lintec Corp., WINCOS LUMI-COOL 1035UH) was used instead of a reflective polarizing film as a resin film. Subsequently, the surface protection film was attached to an image display device and was evaluated. The results thus obtained are presented in Table 1, the characteristic curve B in FIG. 4(a), the characteristic curve B in FIG. 4(b), and FIGS. 7(a) to 7(c).

Comparative Example 2

In Comparative Example 2, a surface protection film was produced in the same manner as in Example 1, except that when the surface protection film was produced, a half-mirror film having a deposited aluminum layer formed on the surface (manufactured by Lintec Corp., WINCOS LUMI-COOL 1015UH) was used instead of a reflective polarizing film as a resin film. Subsequently, the surface protection film was attached to an image display device and was evaluated. The results thus obtained are presented in Table 1, the characteristic curve C in FIG. 4(a), the characteristic curve C in FIG. 4(b), and FIGS. 7(a) to 7(c).

INDUSTRIAL APPLICABILITY

As discussed above, according to the present invention, on the occasion of constructing a surface protection film for a display, when a resin film having a predetermined relative permittivity and having a predetermined reflectance and a predetermined transmittance is used as a film base material, an image would be stably displayed by efficiently transmitting display light coming from the display panel, and in a situation where there is no display light coming from the display panel, a mirror state would be stably attained by efficiently reflecting external light. Furthermore, even in a case in which the surface protection film is attached on the viewer's side of a capacitive touch panel, the touch panel would be operated stably without inhibiting display operability.

Therefore, the surface protection film of the present invention and the like are expected to satisfy the potential demand for imparting a mirror function to existing smart phones, tablets and the like, which function is particularly desired by many female users.

EXPLANATIONS OF LETTERS OR NUMERALS

10: SURFACE PROTECTION FILM
12: RESIN FILM
12a: REFLECTIVE POLARIZING FILM
12b: AUXILIARY BASE MATERIAL LAYER
12b': OTHER AUXILIARY BASE MATERIAL LAYER
14: PRESSURE-SENSITIVE ADHESIVE LAYER
16: RELEASE SHEET
20: DISPLAY PANEL
20a: LIQUID CRYSTAL DISPLAY PANEL
22: LIQUID CRYSTAL LAYER
24: FIRST ABSORPTION TYPE POLARIZING PLATE
26: SECOND ABSORPTION TYPE POLARIZING PLATE
28: BACKLIGHT
30: POSITION INPUT DEVICE

TABLE 1

| | | | | Blank | Example 1 | Example 2 | Example 3 | Comparative Example 1 | Comparative Example 2 |
|---|---|---|---|---|---|---|---|---|---|
| Surface Protection Film | Film | Type | | — | Reflective Polarizing Film | | | Half-Mirror film 1 | Half-mirror film 2 |
| | | Wavelength 555 nm | Reflectance (%) | — | | 54 | | 31 | 52.8 |
| | | | Transmittance (%) | — | | 47.8 | | 41.6 | 24 |
| | | Wavelength 370 to 810 nm | Average Reflectance (%) | — | | 52.6 | | 30.5 | 51.6 |
| | | | Average Transmittance (%) | — | | 49.7 | | 38.4 | 24.6 |
| | | Total Light Transmittance (%) | | — | | 46.77 | | 42.97 | 24.77 |
| | | Haze Value (%) | | — | | 0.8 | | 2.1 | 2.5 |
| | | Relative Permittivity (−) | | — | | 2.2 | | 5.3 | 5.4 |
| | | Thickness (μm) | | — | | 15 | | 83 | 83 |
| | Pressure-Sensitive Adhesive | Type | | — | Acrylic | Acrylic/Silicone Based | | Acrylic | |
| | | Relative Permittivity (−) | | — | 3.3 | 3.7 | | 3.3 | |
| | | Thickness (μm) | | — | 25 | 93 | | 25 | |
| | Surface Protection Film | Wavelength 555 nm | Reflectance (%) | — | 47.2 | 51.8 | 53.6 | 30.3 | 51.3 |
| | | | Transmittance (%) | — | 58.5 | 39.1 | 40.3 | 43.9 | 24.3 |
| | | Wavelength 370 to 810 nm | Average Reflectance (%) | — | 51.3 | 51.8 | 47.5 | 29.3 | 49.9 |
| | | | Average Transmittance (%) | — | 50.7 | 50.0 | 49.5 | 40.4 | 24.6 |
| | | Total Light Transmittance (%) | | — | 51.43 | 51.31 | 51.06 | 44.23 | 24.76 |
| | | Haze Value (%) | | — | 0.3 | 0.2 | 0.1 | 2.13 | 2.58 |
| Shift from axis of transmission of display panel (°) | | | | — | | 0 | 45 | — | — |
| Evaluation | image display state | | Luminance (cc/cm$^2$) | 170.0 | 150.0 | 150.0 | 78.2 | 99.7 | 78.4 |
| | | | Visual Inspection | ⊙ | ⊙ | ⊙ | Δ | Δ | Δ |
| | Mirror state | | Luminance (cc/cm$^2$) | 5.1 | 36.4 | 36.4 | 36.4 | 21.6 | 25.6 |
| | | | Visual Inspection | ○ | ○ | ○ | ○ | Δ | Δ |
| | Display Operability | | | ⊙ | ⊙ | ⊙ | ⊙ | X | X |

40: TRANSPARENT PROTECTION PLATE
100: CAPACITIVE TOUCH PANEL
200: IMAGE DISPLAY DEVICE
300: SURFACE PROTECTION FILM-ATTACHED IMAGE DISPLAY DEVICE

The invention claimed is:

1. A surface protection film for being attached on the viewer's side of a capacitive touch panel,
the surface protection film comprising a resin film and a pressure-sensitive adhesive layer,
wherein the relative permittivity of the resin film measured at a frequency of 1 MHz is set to a value within the range of 1.0 to 5.0,
the reflectance for light having a wavelength of 555 nm is set to a value within the range of 20% to 80%, and
the transmittance for light having a wavelength of 555 nm is set to a value within the range of 20% to 80%, and
wherein the average reflectance of the resin film for light having a wavelength of 370 to 810 nm is set to a value within the range of 20% to 80%, and the average transmittance for light having a wavelength of 370 to 810 nm is set to a value within the range of 20% to 80%.

2. The surface protection film according to claim 1, wherein the resin film includes a reflective polarizing film.

3. A capacitive touch panel, comprising the surface protection film according to claim 1 attached on the viewer's side.

4. A surface protection film-attached image display device,
the image display device comprising a capacitive touch panel on the viewer's side of the display panel,
wherein the image display device is produced by attaching the surface protection film according to claim 1 on the viewer's side surface of the image display device.

* * * * *